(12) United States Patent
Kim et al.

(10) Patent No.: US 6,462,887 B1
(45) Date of Patent: Oct. 8, 2002

(54) ZOOM LENS BARREL STRUCTURE OF ZOOM CAMERA

(75) Inventors: Sung-tae Kim; Sung-wook Choi; Nae-jin Jo, all of Changwon (KR)

(73) Assignee: Samsung Techwin Co., Ltd., Kyongsangnam-do (KR)

( * ) Notice: Subject to any disclaimer, the term of this patent is extended or adjusted under 35 U.S.C. 154(b) by 6 days.

(21) Appl. No.: 09/672,012

(22) Filed: Sep. 29, 2000

(30) Foreign Application Priority Data

Oct. 2, 1999 (KR) .............................. 99-42526

(51) Int. Cl.[7] .............................. G02B 15/14; G02B 7/02
(52) U.S. Cl. ...................................... 359/701; 359/699
(58) Field of Search ............................... 359/813, 700, 359/701, 699

(56) References Cited

U.S. PATENT DOCUMENTS 5,699,200 A * 12/1997 Uno et al. ............... 359/700
5,912,772 A * 6/1999 Aoki ...................... 359/701
6,204,977 B1 * 3/2001 Iwasa ...................... 359/700

* cited by examiner

Primary Examiner—Ricky Mack
Assistant Examiner—Omar Hindi
(74) Attorney, Agent, or Firm—Finnegan, Henderson, Farabow, Garrett & Dunner LLP

(57) ABSTRACT

A zoom lens barrel structure of a zoom camera includes a fixed barrel fixed to the camera, a double helicoid ring having first and second helicoid portions having different lead angles, a front lens group support body coupled to the first helicoid portion of the double helicoid ring, a rear lens group support body coupled to the second helicoid portion of the double helicoid ring, and guide means for guiding the front lens group support body and the rear lens group support body to move along the optical axis of the camera, the guide means having a cam portion formed along a path where the rear lens group support body is coupled to the second helicoid portion.

20 Claims, 7 Drawing Sheets

ZOOM LENS BARREL STRUCTURE OF ZOOM CAMERA

BACKGROUND OF THE INVENTION

1. Field of the Invention

The present invention relates to a zoom lens barrel structure of a zoom camera, and more particularly, to a zoom lens barrel structure of a zoom camera which enables a smooth zoom action.

2. Description of the Related Art

A zoom lens used for a camera changes the magnification ratio of an image by varying a focal length within a predetermined range. The zoom lens has a lens having a variable-focal length.

The zoom lens includes a front lens group which is a convex lens group and a rear lens group which is a concave lens group. Zoom action is performed by adjusting the distance between the front lens group and the rear lens group and the distance between the respective front and rear lens groups and the surface of a film installed at a main body of a camera.

A conventional zoom lens includes two screw shafts for moving the lens groups and a power switching mechanism. According to the zoom lens structure, each of the lens groups is moved as each of the screw shafts rotates to perform zoom action. When the zoom action is completed, one screw is driven by the power switching mechanism to move one lens group so that focusing is achieved. However, to obtain high power in the above zoom lens structure, the movement distance of the zoom lens is prolonged. Also, since the configuration of the power switching mechanism is relatively complicated, space for installation of the mechanism is needed so that miniaturization of a camera is difficult.

In another zoom lens structure, a fixed barrel is fixed to a main body of a camera and a cam barrel is coupled to the fixed barrel. A cam groove is formed on the inner circumferential surface of the cam barrel and a lens group is coupled to the cam groove. In such a zoom lens structure, the lens group moves non-linearly with respect to the surface of a film.

FIG. 1 shows a trace of a front lens group and a rear lens group with respect to the surface of a film in such a zoom lens having barrel structure. Here, the front lens group is coupled to a helicoid portion formed on the cam barrel and moves with the same slope as the lead amount of the helicoid portion following a linear trace 6 with respect to the surface of a film. Also, the rear lens group moves along a non-linear trace 4 with respect to the surface of a film along the cam groove formed on the inner circumferential surface of the cam barrel. In the zoom lens barrel structure, focusing is performed by moving the front lens group by a motor installed at a shutter block. Reference numeral 8 denotes a trace indicating focusing compensation.

When zoom action is performed as the lens group moves along the cam groove formed on the cam barrel, overload is applied to the cam at a point where a cam curve changes so that the zoom action is not smooth.

Also, in the zoom lens barrel structure having the cam barrel, when the barrel retreats toward the camera to be accommodated therein, the rear lens group continues to retreat inside the barrel even when it arrives at an accommodating portion. To solve the above problem, the cam groove formed inside the barrel has a curve structure of being altered to direct the front side at the rear portion. Accordingly, the rear lens group retreating along the cam groove moved toward the front side along the cam groove which is altered to direct toward the front side when it arrives at the accommodating range so that the rear lens group can maintain a uniform distance from the surface of a film in the accommodating range. However, in this case, a great overload is applied to the cam at the point where the cam curve changes so that a smooth accommodation is not possible.

SUMMARY OF THE INVENTION

To solve the above problems, it is an object of the present invention to provide a zoom lens barrel structure which enables high power of a lens and a compact camera and also overload at the curve changing point when the lens group moves inside a barrel is prevented so that a smooth zoom action is performed.

Accordingly, to achieve the above object, there is provided a zoom lens barrel structure of a zoom camera comprising a fixed barrel fixed to the camera, a double helicoid ring having first and second helicoid portions having different lead angles, a front lens group support body coupled to the first helicoid portion of the double helicoid ring, a rear lens group support body coupled to the second helicoid portion of the double helicoid ring, and guide means for guiding the front lens group support body and the rear lens group support body to move along the optical axis of the camera, the guide means having a cam portion formed along a path where the rear lens group support body is coupled to the second helicoid portion.

It is preferred in the present invention that the double helicoid ring is rotatably coupled to the fixed barrel.

Also, it is preferred in the present invention that the fixed barrel has a helicoid portion formed on the inner circumferential surface thereof and the double helicoid ring has a helicoid portion formed on the outer circumferential surface thereof so that the helicoid portion of the double helicoid ring and the helicoid portion of the fixed barrel are coupled each other.

Also, it is preferred in the present invention that the front lens group support body is a barrel having a front lens group helicoid portion formed on the outer circumferential surface thereof and is installed such that the front lens group helicoid portion can be coupled to the first helicoid portion of the double helicoid ring.

Also, it is preferred in the present invention that the rear lens group support body is a ring structure having a rear lens group helicoid portion formed on the outer circumferential surface thereof and is installed such that the rear lens group helicoid portion can be coupled to the second helicoid portion of the double helicoid ring.

Also, it is preferred in the present invention that the guide means comprises a guide groove linearly formed on the inner circumferential surface of the fixed barrel along the optical axis of the camera, a circumferential groove formed along the inner circumference of the double helicoid ring, a guide groove formed on the front lens group support body, and a guide member having a circular plate coupled to the circumferential groove of the double helicoid ring, a first guide portion protruding from the circular plate toward the front side to be coupled to the guide groove of the front lens group support ring to be capable of sliding, and a second guide portion coupled to the linear guide groove of the fixed barrel, the first guide portion for zoom compensation having a cam slot extending from the rear lens group support body through which an extension portion connecting the rear lens group helicoid portion and the rear lens support body passes.

Also, it is preferred in the present invention that an end portion of the cam slot of the first guide portion of the guide member facing a body of the camera is continuously connected to a groove formed parallel to the circumference of the circular plate of the guide member.

Also, it is preferred in the present invention that a linear slide groove is formed lengthwise on the outer circumferential surface of the first guide portion of the guide member and a rib is formed on the guide groove of the front lens group support body so that the rib is coupled to the linear slide groove.

Also, it is preferred in the present invention that the second helicoid portion of the double helicoid ring is formed to extend discontinuously.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
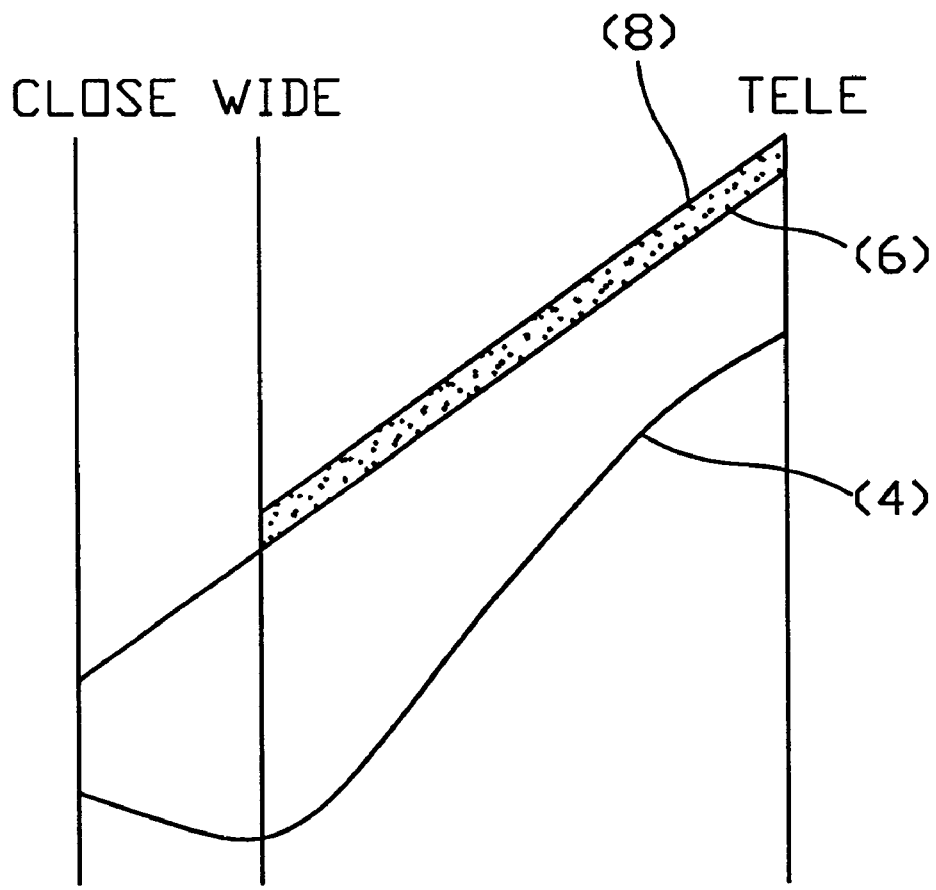
FIG. 1 is a graph showing traces of the front and rear lens groups with respect to the surface of a film according to the conventional zoom lens barrel structure.
Figure 2:
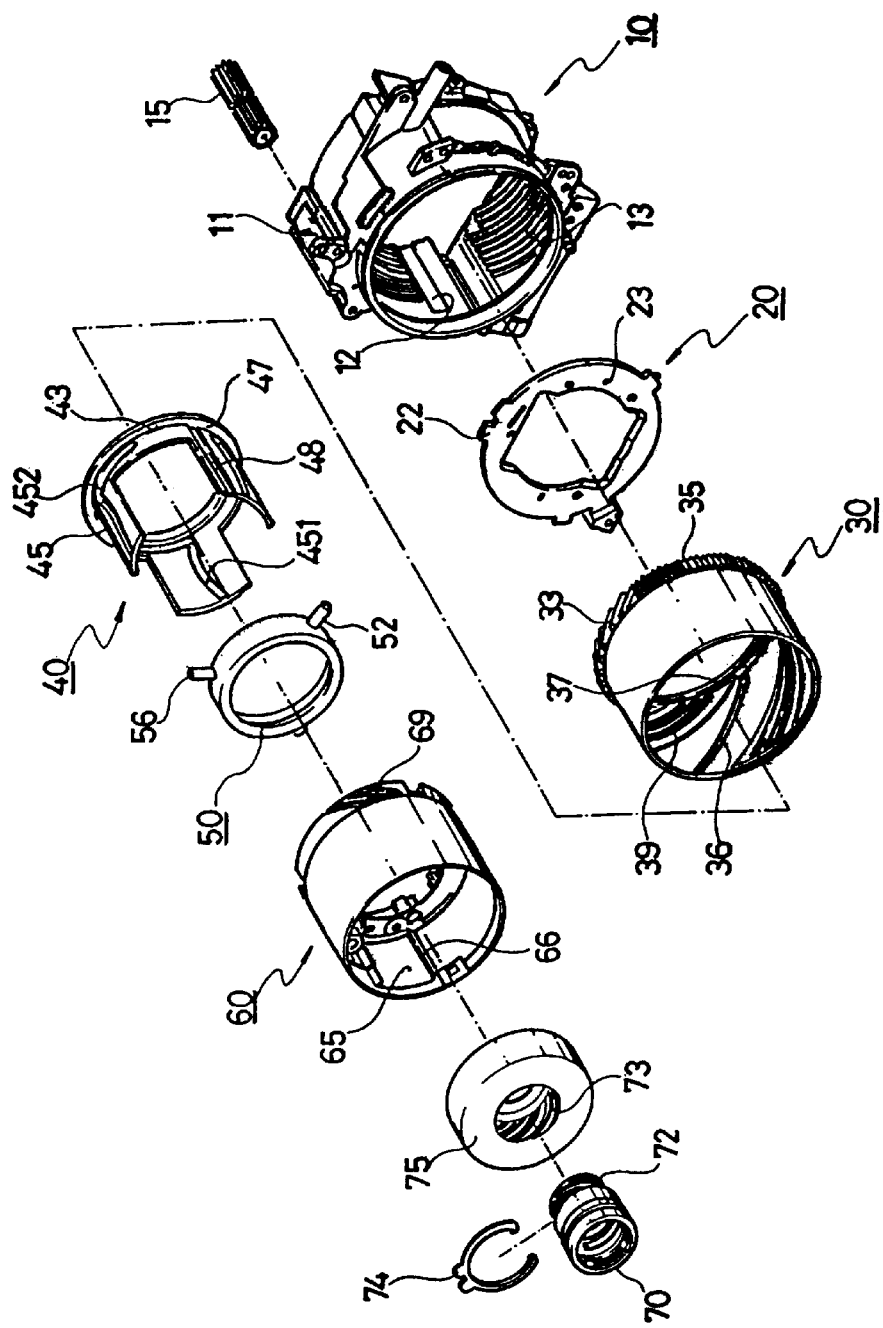
FIG. 2 is an exploded perspective view showing a zoom lens barrel structure according to a preferred embodiment of the present invention.
Figure 3:
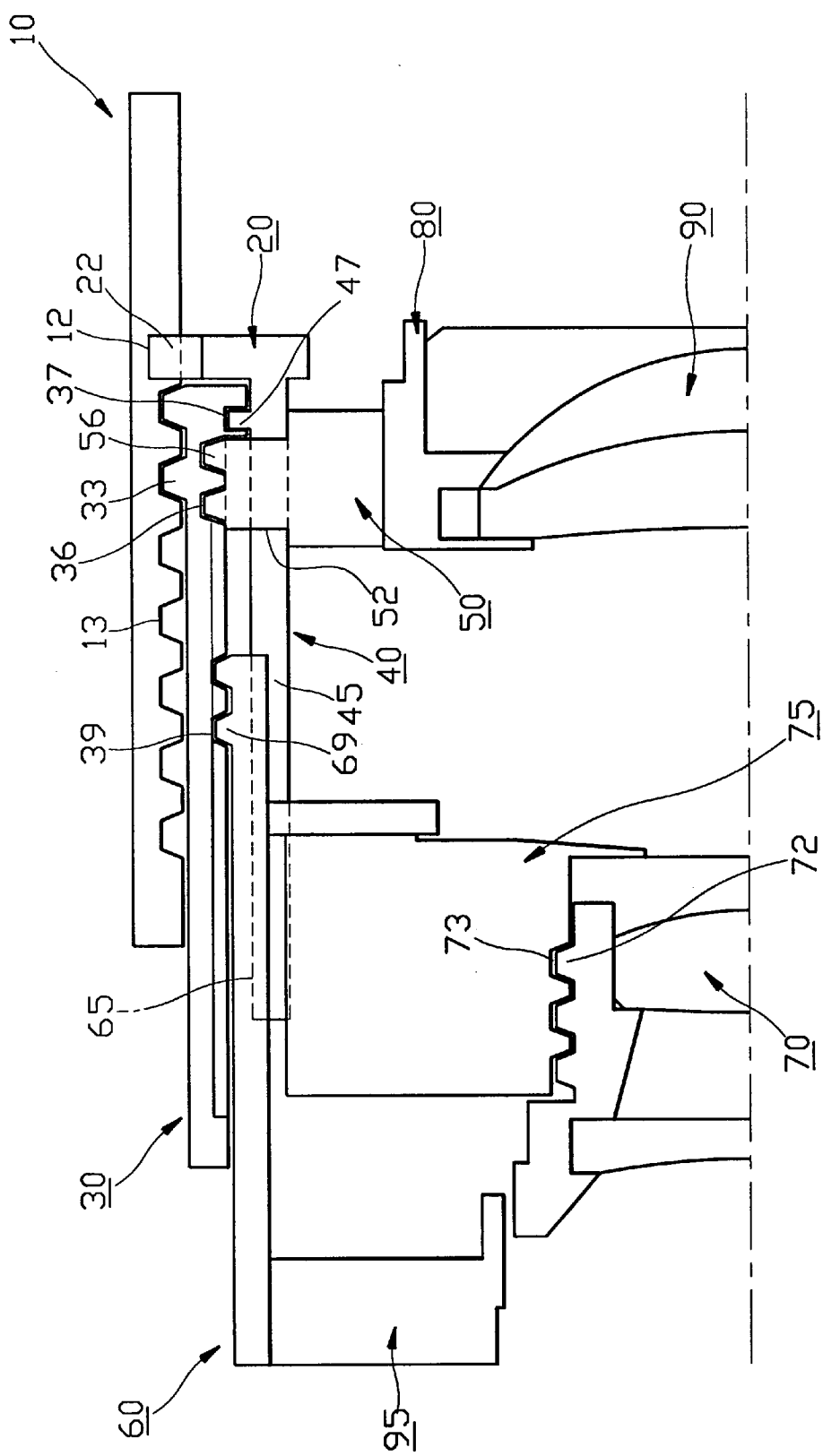
FIG. 3 is a sectional view showing the zoom lens barrel structure of FIG. 2 which is assembled.

Referring to FIGS. 2 and 3, a zoom lens barrel structure according to the present invention includes a fixed barrel 10. A helicoid portion 13 is formed on the inner circumferential surface of the fixed barrel 10. The fixed barrel 10 is fixedly coupled to a main body (not shown) of a camera. A double helicoid ring 30 is coupled to the fixed barrel 10. A mobile helicoid portion 33 and a gear portion 35 are formed on the outer circumferential surface of the double helicoid rings 30. Here, the mobile helicoid portion 33 on the outer circumferential surface of the double helicoid ring 30 is coupled to the helicoid portion 13 of the inner circumferential surface of the fixed barrel 10. Also, the fixed barrel 10 has an opening on the upper portion thereof through which the gear portion 35 of the double helicoid ring 30 is exposed. The power of a motor (not shown) installed at the main body of the camera is transferred to the gear portion 35 of the double helicoid ring 30 via a gear 15. The gear 15 and the motor serve as a driving means. As the power of the motor is transferred, the helicoid ring 30 moves while rotating along the helicoid portion 13 inside the fixed barrel 10.

Figure 4:
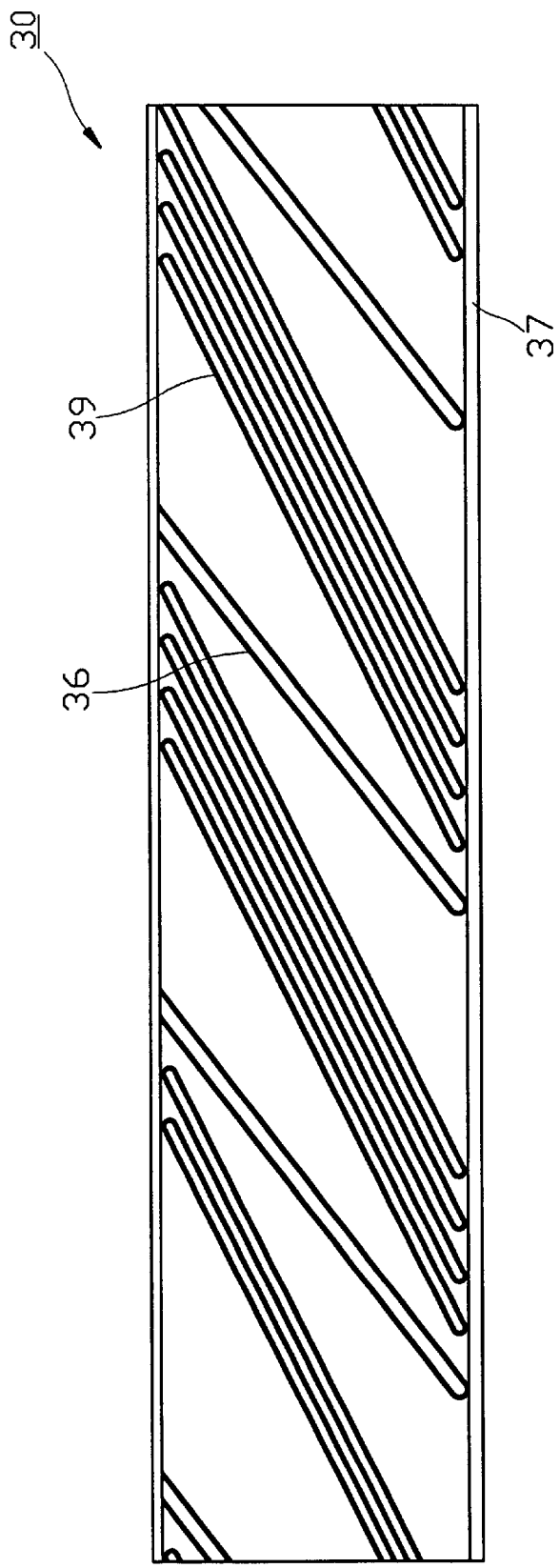
FIG. 4 is a development view showing the inner circumferential surface of the double helicoid ring.
Figure 5:
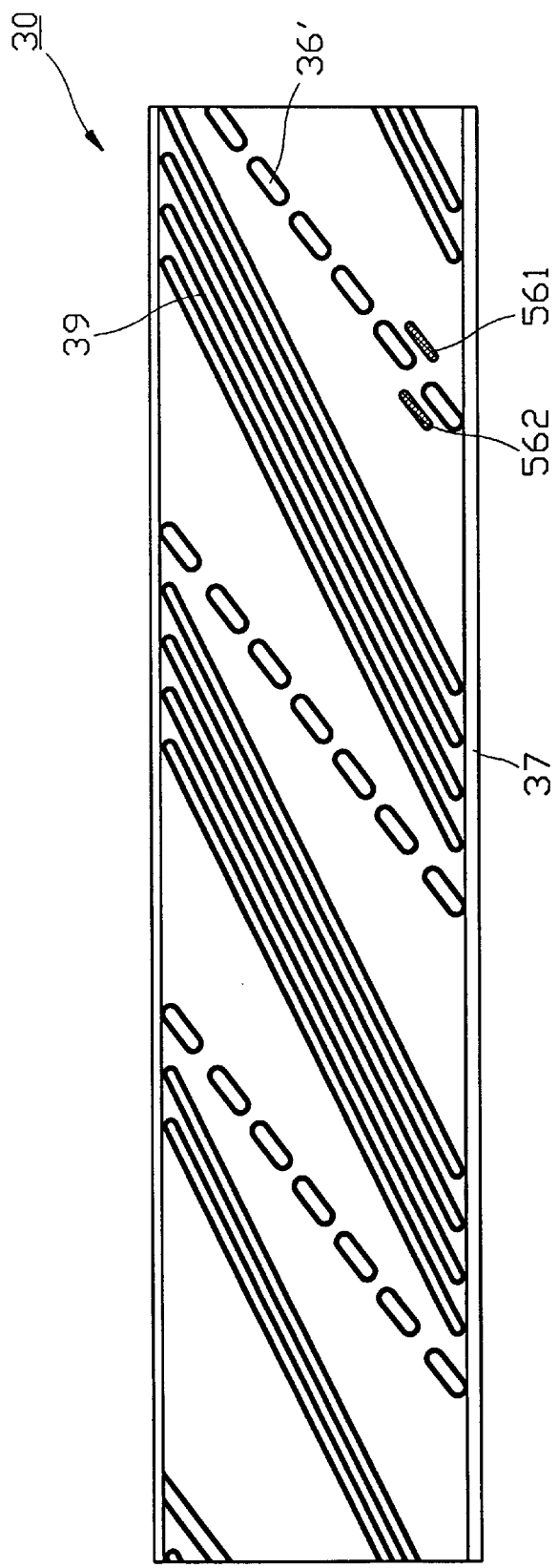
FIG. 5 is a development view of the double helicoid ring in which the second helicoid portion of the double helicoid ring coupled to the helicoid portion of the rear lens group support body is discontinuously formed.

The helicoid ring 30 includes a first helicoid portion 39 and a second helicoid portion 36 formed on the inner circumferential surface thereof, each of which has a different lead angle. Referring to FIG. 4, it can be seen that the first and second helicoid portions 39 and 36 having different lead angles are formed on the inner circumferential surface of the helicoid ring 30. Here, the first and second helicoid portions 39 and 36 are arranged such that they do not overlap each other by dividing the circumference of the helicoid ring 30. A circumferential groove 37 is formed on the inner circumferential surface of the double helicoid ring 30 along the circumference of the rear end thereof. Alternatively, as shown in FIG. 5, a helicoid portion 36' can be formed instead of the second helicoid portion 36.

A front lens group support body 60 and a rear lens group support body 50 are screw-coupled to the first and second helicoid portions 39 and 36 of the helicoid ring 30, respectively. That is, the front lens group support body 60 as a zoom ring has a front lens group helicoid portion 69 formed on the outer circumferential surface thereof and is installed such that the front lens group helicoid portion 69 is coupled to the first helicoid portion 39 of the double helicoid ring 30. A guide groove 65 is formed on the inner circumferential surface of the front lens group support body 60. Also, the rear lens group support body 50 is of a ring structure and has a rear lens group helicoid portion 56 coupled to the second helicoid portion 36. The rear lens group helicoid portion 56 is installed such that it can be coupled to the second helicoid portion 36 of the double helicoid ring 30. In the present preferred embodiment, the rear lens group support body 50 has a plurality of protrusions 52 extending from the outer circumferential surface thereof and the helicoid portion 56 is formed on the top surface of each of the protrusions 52. As shown in FIG. 3, the front lens group support body 60 supports a shutter block 75 and a front lens group 70 is coupled by geared portions 72 and 73 inside the shutter block 75. Also, a barrier assembly 95 is installed.

The zoom lens barrel structure according to the present invention includes a guide means for guiding the movement of the front lens group support body 60 and the rear lens group support body 50 along the optical axis of the camera. Accordingly, the front lens group support body 60 and the rear lens group support body 50 screw-coupled to the first and second helicoid portions 39 and 36 of the double helicoid ring 30 can move along the lead by the first and second helicoid portions 39 and 36.

Figure 6:
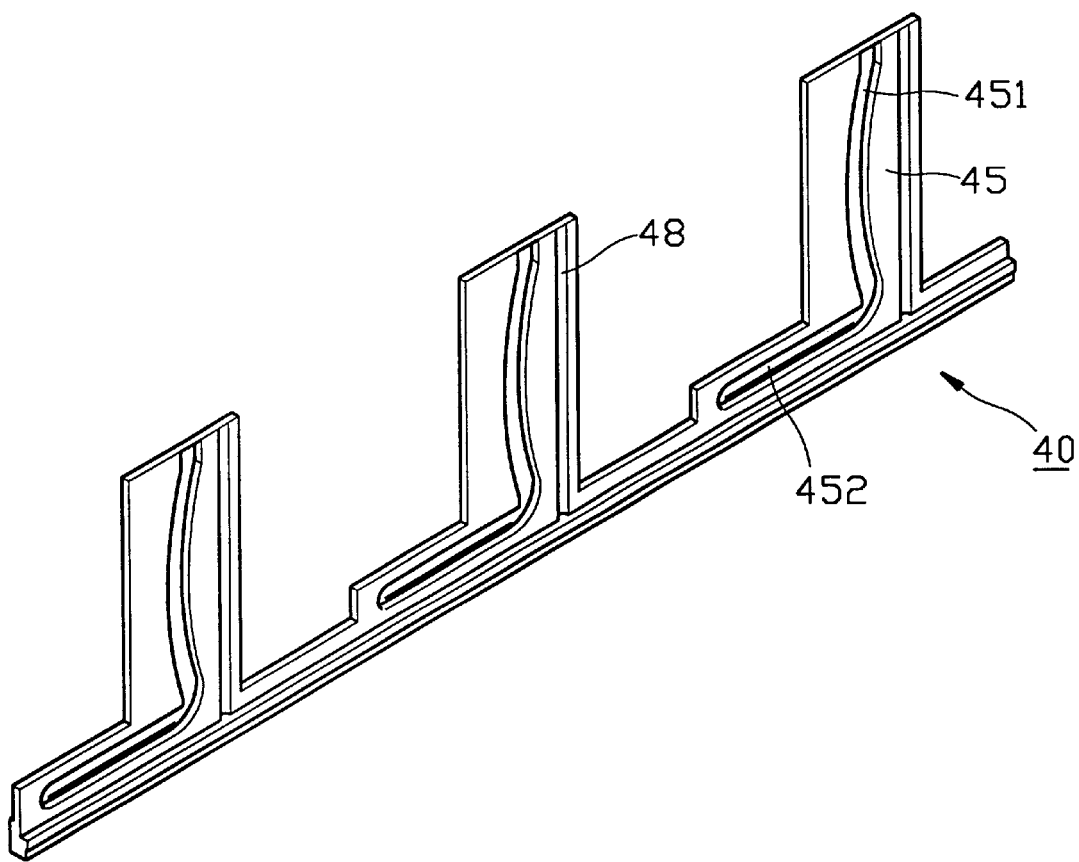
FIG. 6 is a perspective view showing the guide ring which is unfolded.

In the present preferred embodiment, to embody the above guide means, the fixed barrel has a guide groove 12 formed along the optical axis on the inner circumferential surface thereof. Also, the guide means includes a guide plate 20 and a guide ring 40 as guide members. The guide plate 20 is arranged in the rear of the double helicoid ring 30 and coupled to the rear side of a circular plate 47 of the guide ring 40. A plurality of guiding portions 22 coupled to the guide groove 12 of the fixed barrel 10 protrude from the outer circumferential surface of the guide plate 20. The guide plate 20 has a plurality of screw holes 23 at the outer circumferential surface thereof. The circular plate 47 of the guide ring 40 is rotatably coupled to the circumferential groove 37 of the double helicoid ring 30. Also, a plurality of grooves 43 where female screws are formed are installed at the guide ring 40 and screws (not shown) are coupled thereto through screw holes 23 formed in the guide plate 20. Accordingly, the guide ring 40 is rotatably installed at the double helicoid ring 30 and is integrally coupled to the guide plate 20 connected to a linear guide groove 12 along the optical axis of the fixed barrel 10. As a result, when the double helicoid ring 30 moved while rotating inside the fixed barrel 10, the guide members (the guide plate 20 and the guide ring 40) linearly move along the guide groove 12 of the fixed barrel 10 along the optical axis without rotating. Also, the guide ring 40 has a plurality of guide portions 45 coupled to the guide groove 65 of the front lens group support body 60. That is, the guide portions 45 protrude to the front side of the circular plate 47 and coupled to the guide groove 65 of the zoom ring 60. Preferably, a slide groove 48 is formed lengthwise on the outer circumferential surface of each of the guide portions 45 (see FIG. 6) and ribs 66 coupled to the slide grooves 48 are formed on the inner circumferential surface of the front lens group support body 60. As a result, the guide members and the front lens group support body 60 are coupled more stably. Also, a cam slot 451 is formed on each of the guide portions 45 of the guide ring 40. The protrusions 52 of the rear lens group support body 50 pass through the cam slots 451. The helicoid portion 56 at the top surface of each of the protrusions 52 is coupled to the second helicoid portion 36 of the double helicoid ring 30. FIG. 6 shows the slide groove 48 and the cam slot 451 of the guide ring 40. Here, another slot (452) will be described later.

When the double helicoid ring 30 coupled to the inner surface of the fixed barrel 10 is rotated by the driving means 15, the guide plate 20 linearly moves along the guide groove 16 of the fixed barrel 10. Thus, the guide ring 40 coupled to the guide plate 20 linearly moves. Here, the double helicoid ring 30 rotates while the first helicoid portion 39 thereof is engaged with the helicoid portion 69 of the zoom ring 60. Then, the front lens group support body 60 is guided by the guide ring 40 which is the guide member and moves as far as the lead of the first helicoid portion 39. Here, the rear lens group support body 50 is coupled to the double helicoid ring 30 as each of the protrusions 52 is coupled to the second helicoid portion 36 by passing through the cam slot 451 of the guide portion 45 of the guide ring 40. By the cam slot 451, the rear lens group support body 50 moves according to the slope of lead of the second helicoid portion 36 and, simultaneously, along the trace of the cam slot 451. Such overlapping movement guarantees zoom compensation. Thus, when the double helicoid ring 30 rotates and moves inside the fixed barrel 10, the rear lens group support body 50 is moved by the rotation of the double helicoid ring 30 while each of the protrusions 52 is guided by the cam slot 451. As a result, the rear lens group support body 50 moves along the overlapped traces of the cam slot 451 and the second helicoid portion 36. Thus, the front and rear lens group support bodies 60 and 50 relatively move along the optical axis with respect to the surface of the film to perform zoom compensation and achieve zoom action accordingly.

In the zoom lens barrel structure according to the present invention, there may be a problem that the rear lens group support body 50 continues to retreat inside the double helicoid ring 30 when the barrel retreats toward the camera and arrives an accommodating range where the barrel is accommodated. To solve the above problem, the present invention includes an accommodation slot 452 formed to be continuously connected to the end portion of the cam slot 451 formed in the guide portion 45 of the guide ring 40 which is the guide member, and parallel to the circumference of the circular plate 47 of the guide member. The structure of the accommodation slot 452 is shown in FIG. 6. When the zoom lens barrel continues to retreat to arrive at the accommodating range, the protrusions 52 of the rear lens group support body 50 is arranged in the accommodation slot 452. Consequently, the rear lens group support body 50 is prevented from further retreating inside the double helicoid ring 30.

Figure 7:
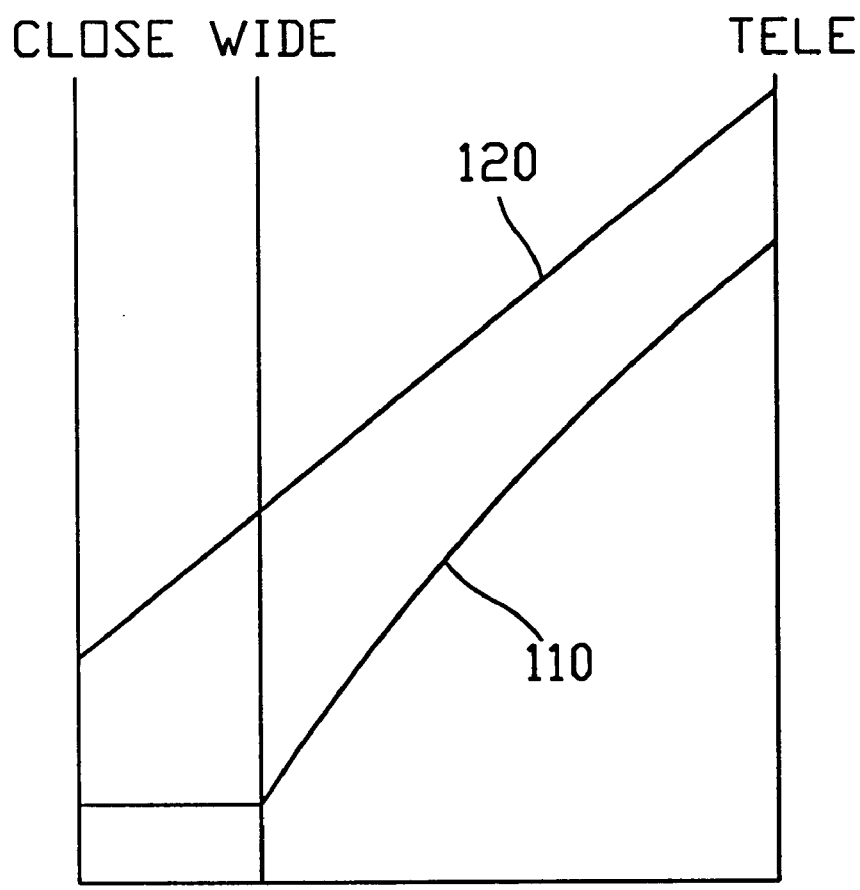
FIG. 7 is a graph showing the traces of the relative movement of the front lens group support body and the rear lens group support body along the optical axis with respect to the double helicoid ring.

Referring to FIG. 7, as can be seen from the trace 120 of the front lens group support body 60, in the zoom lens barrel structure according to the present invention, the front lens group support body 60 linearly moves at the slope of the lead amount of the first helicoid portion 39 coupled thereto. As the movement of the protrusions 52 of the rear lens group support body 50 is overlapped according to the trace of the cam slot 451 of the guide ring 40 and the lead of the second helicoid portion 36, the rear lens group moves non-linearly with respect to the surface of the film. The shutter block 75 performs focusing compensation when a photograph is taken at a selected zooming mode.

FIG. 5 shows the unfolded double helicoid portion 30 when the second helicoid portion 36' of the double helicoid ring 30 coupled to the helicoid portion 56 of the rear lens group support body 50 is discontinuously formed. In this case, helicoid portions 561 and 562 of the helicoid portion 56 of the rear lens group support body 50 are aligned to go awry with each other. Therefore, the helicoid portion 56 can continuously moves along the discontinuous second helicoid portion 36'.

As described above, in the present invention, the front and rear lens group support bodies move by two helicoid portions formed on the helicoid ring to perform zoom action. Thus, no curve changing point exist during the zoom action of the lens groups and thus a smooth zoom action can be achieved. Also, since the front and rear lens groups relatively move along the helicoid portions according to the structure of the barrel, a high power of the lens can be obtained by a relatively short movement and miniaturization of a camera is possible.

It is noted that the present invention is not limited to the preferred embodiment described above, and it is apparent that variations and modifications by those skilled in the art can be effected within the spirit and scope of the present invention defined in the appended claims.

What is claimed is:

1. A zoom lens barrel structure of a zoom camera comprising:
   a front lens group support body;
   a rear lens group support body;
   a double helicoid ring having first and second helicoid portions, the first helicoid portion being coupled to the front lens group support body and the second helicoid portion being coupled to the rear lens group support body;
   guide means for guiding the front lens group support body and the rear lens group support body in movement along the optical axis of the camera, the guide means including a guide member having a cam portion for guiding the rear lens group support body along a predetermined path of the cam portion; and
   a fixed barrel fixed to the camera for supporting the front lens group support body, the rear lens group support body, the double helicoid ring, and the guide means.

2. The structure as claimed in claim 1, wherein the double helicoid ring is rotatably coupled to the fixed barrel.

3. The structure as claimed in claim 1, wherein the fixed barrel has a helicoid portion formed on the inner circumferential surface thereof and the double helicoid ring has a helicoid portion formed on the outer circumferential surface thereof so that the helicoid portion of the double helicoid ring and the helicoid portion of the fixed barrel are coupled each other.

4. The structure as claimed in claim 1, wherein the front lens group support body is a barrel having a front lens group helicoid portion formed on the outer circumferential surface thereof and is installed such that the front lens group helicoid portion can be coupled to the first helicoid portion of the double helicoid ring.

5. The structure as claimed in claim 1, wherein the rear lens group support body is a ring structure having a rear lens group helicoid portion formed on the outer circumferential surface thereof and is installed such that the rear lens group helicoid portion can be coupled to the second helicoid portion of the double helicoid ring.

6. The structure as claimed in claim 3, wherein the rear lens group support body is a ring structure having a rear lens group helicoid portion formed on the outer circumferential surface thereof and is installed such that the rear lens group helicoid portion can be coupled to the second helicoid portion of the double helicoid ring.

7. The structure as claimed in claim 1, wherein the guide means comprises:

a guide groove linearly formed on the inner circumferential surface of the fixed barrel along the optical axis of the camera;

a circumferential groove formed along the inner circumference of the double helicoid ring;

a guide groove formed on the front lens group support body; and a guide member having a circular plate coupled to the circumferential groove of the double helicoid ring, a first guide portion protruding from the circular plate toward the front side to be slidingly coupled to the guide groove of the front lens group support body for zoom compensation, and a second guide portion coupled to the linear guide groove of the fixed barrel, the first guide portion having the cam portion extending from the rear lens group support body and through which a protrusion connecting the rear lens group helicoid portion and the rear lens group support body passes.

8. The structure as claimed in claim 7, wherein an end portion of the cam slot of the first guide portion of the guide member facing a body of the camera is continuously connected to a groove formed parallel to the circumference of the circular plate of the guide member.

9. The structure as claimed in claim 7, wherein a linear slide groove is formed lengthwise on the outer circumferential surface of the first guide portion of the guide member and a rib is formed on the guide groove of the front lens group support body so that the rib is coupled to the linear slide groove.

10. The structure as claimed in claim 8, wherein a linear slide groove is formed lengthwise on the outer circumferential surface of the first guide portion of the guide member and a rib is formed on the guide groove of the front lens group support body so that the rib is coupled to the linear slide groove.

11. The structure as claimed in claim 5, wherein the second helicoid portion of the double helicoid ring is formed to extend discontinuously.

12. The structure as claimed in claim 6, wherein the second helicoid portion of the double helicoid ring is formed to extend discontinuously.

13. A zoom lens barrel structure of a zoom camera comprising:

a front lens group support body;

a rear lens group support body;

a double helicoid ring having first and second helicoid portions, the first helicoid portion being coupled to the front lens group support body and the second helicoid portion being coupled to the rear lens group support body;

a guide member comprising a circular plate and at least one guide portion protruding from the circular plate and coupled to the front lens group support body, the guide portion including a cam portion formed along a path in which the rear lens group support body moves; and a fixed barrel fixed to the camera for supporting the front lens group support body, the rear lens group support body, the double helicoid ring, and the guide means.

14. The structure as claimed in claim 13, wherein the double helicoid ring is rotatably coupled to the fixed barrel.

15. The structure as claimed in claim 13, wherein the fixed barrel has a helicoid portion formed on the inner circumferential surface thereof and the double helicoid ring has a helicoid portion formed on the outer circumferential surface thereof so that the helicoid portion of the double helicoid ring and the helicoid portion of the fixed barrel are coupled to each other.

16. The structure as claimed in claim 13, wherein the front lens group support body comprises a barrel having a front lens group helicoid portion formed on the outer circumferential surface thereof and wherein the front lens group helicoid portion is coupled to the first helicoid portion of the double helicoid ring.

17. The structure as claimed in claim 13, wherein the rear lens group support body comprises a ring structure having a rear lens group helicoid portion formed on the outer circumferential surface thereof and wherein the rear lens group helicoid portion is coupled to the second helicoid portion of the double helicoid ring.

18. The structure as claimed in claim 13, further comprising:

a first guide groove linearly formed on the inner circumferential surface of the fixed barrel along the optical axis of the camera;

a circumferential groove formed along the inner circumference of the double helicoid ring; and a second guide groove formed on the front lens group support body, wherein the circular plate of the guide member is coupled to the second circumferential groove, the guide portion is slidingly coupled to the second guide groove, and the cam portion comprises a cam slot extending from the rear lens group support body and receiving a protrusion of the rear lens group support body.

19. The structure as claimed in claim 18, wherein the guide portion comprises a groove formed parallel to the circumference of the circular plate, and wherein the cam slot comprises an end portion continuously connected to the groove of the guide portion.

20. The structure as claimed in claim 18, comprising a linear slide groove formed lengthwise on the outer circumferential surface of the first guide portion, and a rib formed on the second guide groove and coupled to the linear slide groove.

* * * * *